United States Patent
Sprigg et al.

(10) Patent No.: US 7,844,040 B2
(45) Date of Patent: Nov. 30, 2010

(54) DEVICE AND METHOD FOR ANNOUNCING AN INCOMING CALL

(75) Inventors: Stephen A. Sprigg, Poway, CA (US); Paul E. Jacobs, La Jolla, CA (US); Nikhil Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1301 days.

(21) Appl. No.: 11/361,231

(22) Filed: Feb. 23, 2006

(65) Prior Publication Data

US 2007/0207781 A1    Sep. 6, 2007

(51) Int. Cl.
*H04M 1/56* (2006.01)
*H04M 15/06* (2006.01)

(52) U.S. Cl. .................. 379/142.09; 379/142.06; 379/142.17; 455/415

(58) Field of Classification Search ........... 379/67.1, 379/88.12, 88.19, 142.01, 142.12, 142.13, 379/142.17, 207.14, 211.01, 215.01, 373.01, 379/373.02, 373.04, 371.03, 375.01, 376.01, 379/376.02, 373.03; 455/414.1, 461, 415
See application file for complete search history.

(56) References Cited

U.S. PATENT DOCUMENTS

| | | | | |
|---|---|---|---|---|
| 5,907,604 A | * | 5/1999 | Hsu | 379/142.06 |
| 6,351,639 B1 | * | 2/2002 | Motohashi | 455/420 |
| 6,535,585 B1 | * | 3/2003 | Hanson et al. | 379/88.12 |
| 6,757,533 B2 | * | 6/2004 | Lampela et al. | 455/415 |
| 6,760,413 B2 | * | 7/2004 | Cannon et al. | 379/88.19 |
| 7,280,530 B2 | * | 10/2007 | Chang et al. | 370/352 |
| 7,616,741 B2 | * | 11/2009 | Reynolds et al. | 379/88.17 |
| 7,697,923 B2 | * | 4/2010 | Eronen | 455/414.1 |
| 2004/0032946 A1 | * | 2/2004 | Koser et al. | 379/373.01 |
| 2004/0120505 A1 | * | 6/2004 | Kotzin et al. | 379/373.01 |
| 2004/0196966 A1 | * | 10/2004 | Bushnell | 379/88.19 |

* cited by examiner

*Primary Examiner*—Binh K Tieu
(74) *Attorney, Agent, or Firm*—Christopher S Chow; James T. Hagler

(57) ABSTRACT

A telecommunications device and/or service are provided that enable a user to identify a particular call announcement to be used when announcing an incoming call from the user on the call recipient's telecommunications device. The call from the user includes call data that identifies the particular call announcement. When received, the recipient's device processes the incoming call and announces it with the requested announcement.

29 Claims, 7 Drawing Sheets

Sample Message Format

DEVICE AND METHOD FOR ANNOUNCING AN INCOMING CALL

BACKGROUND OF THE INVENTION

The invention relates generally to the field of telecommunications, and more particularly to announcements for incoming messages on telecommunications devices.

People today make widespread use of telecommunications equipment. Nearly every family in this country has at least conventional wired telephone service, and very many also have wireless telecommunications service. Telephone calls are made so frequently that it is a routine part of many people's day.

New calling features are constantly evolving to enhance the users' call experience. One such feature is caller-specific ring tones. With this feature, a call that arrives at an enabled telecommunications device may include caller identification information that identifies the call originator. If so, the device resolves the caller identification information to locally-stored contact information if present. If the locally-stored contact information identifies a particular call announcement, the device announces the incoming call with that announcement. Examples of call announcements include media files or ring tones that are played to announce the call.

Many people like this feature, however its usefulness depends on the user (i.e., the call recipient) making each assignment of inbound message announcements to locally-stored contact information, which in turn depends on the user storing contact information on the device for many call originators.

An alternative method and mechanism for incoming message announcement has eluded those skilled in the art, until now.

SUMMARY OF THE INVENTION

The invention is directed to telecommunications devices and services that enable a user to assign, on a call-originating device, a preferred call announcement that will be rendered on the call-receiving device. In one aspect, a method is provided for associating call announcements with receiving devices. The method includes identifying contact information for a receiving device, and identifying a call announcement intended to be rendered on the receiving device to announce incoming calls from the originating device. The method further includes associating the identified call announcement with the contact information for the receiving device, and initiating an outbound call from the originating device to the receiving device.

In another aspect, a method is provided for announcing an incoming call on a receiving device. The method includes receiving call data associated with an incoming call, analyzing the call data to determine whether a particular call announcement has been requested, and if so, announcing the call using the particular call announcement.

In yet another aspect, a method is provided for announcing an incoming call on a receiving device. The method includes receiving call data associated with an incoming call, and analyzing the call data to determine whether a particular call announcement has been requested. If a particular call announcement has been requested, a determination is made whether the requested call announcement resides locally on the receiving device, and if so, announcing the call using the requested call announcement.

In still another aspect, a device is provided that includes a communications module for receiving inbound call data, a storage medium including call announcements, a processor for executing computer code, and a memory readable by the processor. The memory includes executable instructions configured to cause the processor to analyze incoming call data to determine if a call announcement has been requested and if so, to announce the incoming call data using the requested call announcement.

In yet another aspect, a system is provided for making calls that includes an originating device for making calls and a receiving device for receiving calls. The originating device is configured to transmit call data including an identifier for a call announcement to be rendered in conjunction with receiving a call from the originating device. The receiving device is configured to receive the call data in conjunction with an incoming call from the originating device and to analyze the call data to retrieve the identifier for the call announcement. The receiving device is further configured to announce the incoming call using the call announcement.

DETAILED DESCRIPTION

What follows is a detailed description of various techniques and mechanisms for call announcement. Very generally stated, a telecommunications device and/or service are provided that enable a user to identify a particular call announcement to be used when announcing an incoming call from the user on the call recipient's telecommunications device. The call from the user includes call data that identifies the particular call announcement. When received, the recipient's device processes the incoming call and announces it with the requested announcement.

Before proceeding, it will be helpful to define some terms that will be used while describing embodiments of the invention. Accordingly, throughout this detailed description, the following terms shall have the meanings ascribed to them here:

The term "call" means any communication between two telecommunication devices, and is not limited to telephone calls. Rather, the term "call" will be used in the broadest sense and includes telephone calls, but also includes any other message or communication between two devices, such as SMS messages, instant messages, e-mail, and the like.

The term "announcement" or "call announcement" means a sensory perceptible occurrence that is performed by a telecommunication device to indicate an incoming call. An announcement could be media file, particular sequence of flashing or steady lights, a vibration, or any other sensory perceptible mechanism.

The term "originating device" means a telecommunications device that originates an outbound call. The term originating device may also be used interchangeably with "calling party" or "originating party."

The term "receiving device" means a telecommunications device that receives an inbound call. The term receiving device may also be used interchangeably with "called party" or "receiving party."

Figure 1:
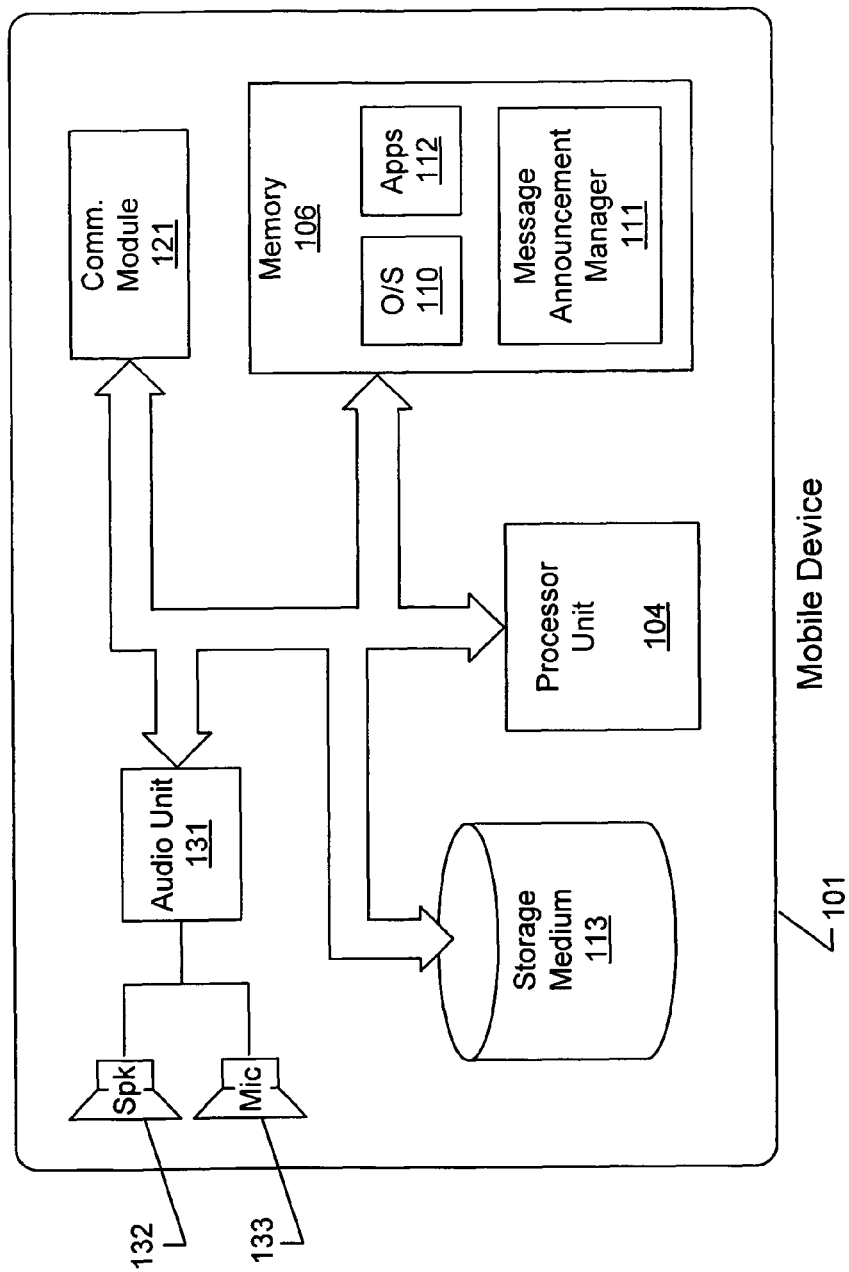
FIG. 1 is a functional block diagram generally illustrating a sample mobile device in which implementations of the invention are particularly applicable.

FIG. 1 is a functional block diagram generally illustrating a sample mobile device 101, such as a cellular telephone, in which implementations of the invention are particularly applicable. The mobile device 101 may be any handheld computing device, such as a cellular telephone, a personal digital assistant, a portable music player, a global positioning satellite (GPS) device, or the like. Although described here in the context of a handheld computing device, it should be appreciated that implementations of the invention may have equal applicability in other areas, such as conventional wired telephone systems and the like.

In this example, the mobile device 101 includes a processor unit 104, a memory 106, a storage medium 113, and an audio unit 131. The processor unit 104 advantageously includes a microprocessor or a special-purpose processor such as a digital signal processor (DSP), but may in the alternative be any conventional form of processor, controller, microcontroller, or state machine.

The processor unit 104 is coupled to the memory 106, which is advantageously implemented as RAM memory holding software instructions that are executed by the processor unit 104. In this embodiment, the software instructions stored in the memory 106 include a message announcement manager 111, an operating system 110, and one or more other applications 112. The memory 106 may be on-board RAM, or the processor unit 104 and the memory 106 could collectively reside in an ASIC. In an alternate embodiment, the memory 106 could be composed of firmware or flash memory.

The processor unit 104 is coupled to the storage medium 113, which may be implemented as any nonvolatile memory, such as ROM memory, flash memory, or a magnetic disk drive, just to name a few. The storage medium 113 could also be implemented as any combination of those or other technologies, such as a magnetic disk drive with cache (RAM) memory, or the like. In this particular embodiment, the storage medium 113 is used to store data during periods when the mobile device 101 is powered off or without power. The storage medium 113 and information that may be stored on it are illustrated in greater detail in FIG. 2 and described below.

The mobile device 101 also includes a communications module 121 that enables bidirectional communication between the mobile device 101 and one or more other computing devices. The communications module 121 may include components to enable RF or other wireless communications, such as a cellular telephone network, Bluetooth connection, wireless local area network, or perhaps a wireless wide area network. Alternatively, the communications module 121 may include components to enable land line or hard wired network communications, such as an Ethernet connection, RJ-11 connection, universal serial bus connection, IEEE 1394 (Firewire) connection, or the like. These are intended as non-exhaustive lists and many other alternatives are possible.

The audio unit 131 is a component of the mobile device 101 that is configured to convert signals between analog and digital format. The audio unit 131 is used to by the mobile device 101 to output sound using a speaker 132 and to receive input signals from a microphone 133. Audible announcements of an incoming call can be created using the audio unit 131 and the speaker 132. For instance, distinctive ringing noises can be played to announce an incoming call. Various musical notes or tunes could also be used.

Although incoming calls are announced audibly in this implementation, other mechanisms could also be employed. For example, a vibratory mechanism could be used to announce calls by vibrating the mobile device 101 in a unique manner for different callers. Or a system of lights could be used that flash in a unique sequence or with different colors. The breadth of the invention is envisioned to encompass announcements delivered using any sensory perceptible mechanism or technique.

The message announcement manager 111 is a utility or service that is configured to identify an appropriate announcement for incoming calls. Briefly stated, the message announcement manager 111 evaluates incoming call data to determine if a particular announcement has been requested. If so, the message announcement manager 111 causes the requested announcement to be played or otherwise rendered to announce the call.

Figure 2:
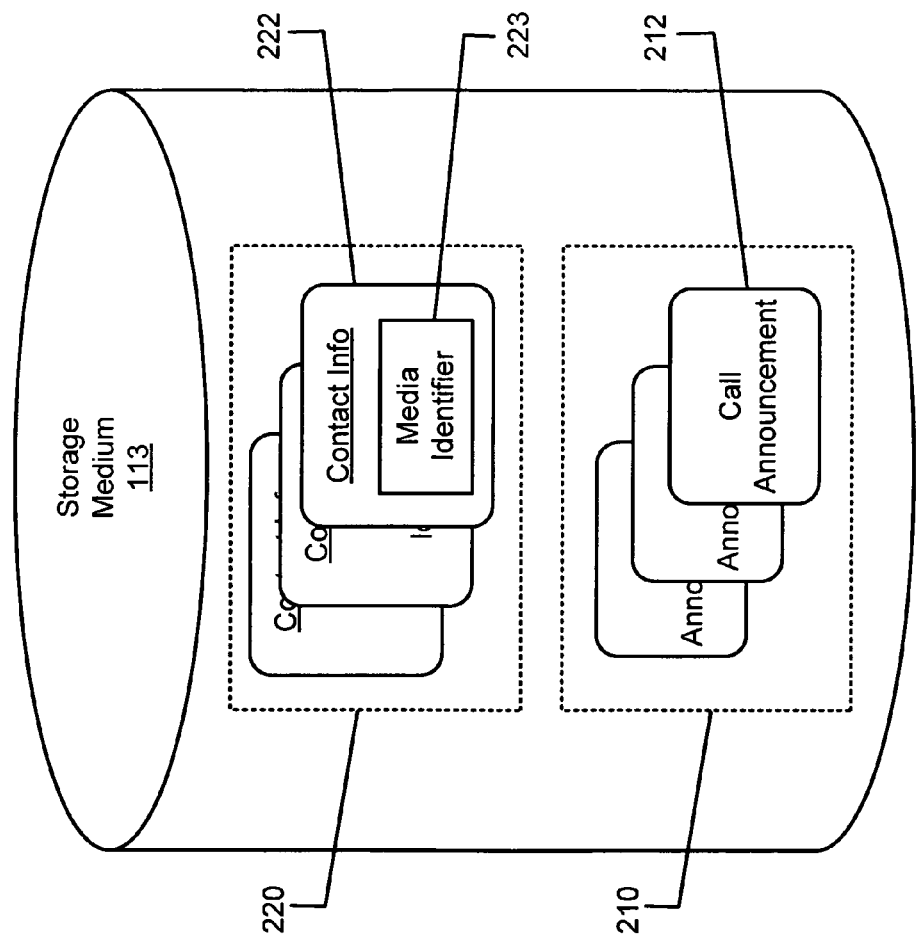
FIG. 2 is a functional block diagram illustrating in slightly greater detail the storage medium loaded with data that is employed by certain implementations of the invention.

FIG. 2 is a functional block diagram illustrating in slightly greater detail the storage medium 113 loaded with data that is employed by certain implementations of the invention. Stored on the storage medium 113 are several call announcements 210. In this implementation, the call announcements 210 are media files, such as music or distinctive audio tones (commonly referred to as "ringtones"), that are rendered to announce an incoming call. There are several different types of media files in many different formats that could be used to identify incoming calls. For instance, monophonic or polyphonic audio files could be used in different formats, such as MIDI, CMX, RTTTL, AIFF, SMAF, PCM, MP3, and the like. Each call announcement is individually identifiable by some criteria, such as file name or the like.

Although the call announcements 210 are described here as audio files, it will be appreciated that the call announcements 210 could be any type of resource that includes description information for any perceptible type of announcement. For instance, if the mobile device announced incoming calls with distinctive vibratory announcements, each call announcement 212 could include a different description of a vibration. Similarly, if the mobile device announced incoming calls with distinctive flashing lights, the call announcements 210 could each describe a distinct pattern of flashing or colored lights, or some combination of the two. These are but examples and others will become apparent with routine experimentation.

Also on the storage medium 113 reside several "contacts" 220, which are data files or records that describe individuals or entities. Each contact 222 may include information that describes or identifies individuals or entities that may be contacted by the user of the mobile device 101, or that may contact the user. Examples of the information that may be stored in a contact 222 include the name of the person with whom the contact is associated, the company that employs the person, the person's telephone number and address, the person's e-mail address, and other information.

In this implementation, the contact 222 also includes an outbound media identifier 223 that identifies a particular call announcement to be used to announce incoming calls from the user. In other words, the contact 222 could include an identifier for the particular call announcement that the user would like to be played on the receiving device of the entity or individual with whom the contact 221 is associated. The media identifier 223 could be a file name for the particular call announcement, or some other identifier such as a class of call announcements (e.g., any three-ring stutter tone, any music by Bach, any song of a particular genre, a flashing colored light, or the like).

In another implementation, a common outbound call announcement could be used to identify all calls made from the call originating device to any other call receiving device that supports this functionality. In this implementation, different call announcements need not be identified in contact information for various entities as the same call announcement would be used for all outbound calls. For that reason, a single outbound call announcement identification could be made and stored for use in all outbound calls. Similarly, another implementation could employ a combination of these where a common call announcement is used unless a different outbound call announcement is specified in contact information for a particular entity.

The storage medium 113 illustrated in FIG. 2 could reside on both the call originating device and the call receiving device. Although in practice the storage media on both devices will probably include much of the same information, it will be appreciated that the actual call announcement resources could reside only on the call receiving device and the outbound call announcement identification could be made only on the call originating device. The storage medium 113 is illustrated with both merely to demonstrate the more likely practical implementation and should not be viewed as suggesting that all the elements illustrated must reside on both the call originating device and the call receiving device for a proper functioning of implementations of the invention.

Figure 3:
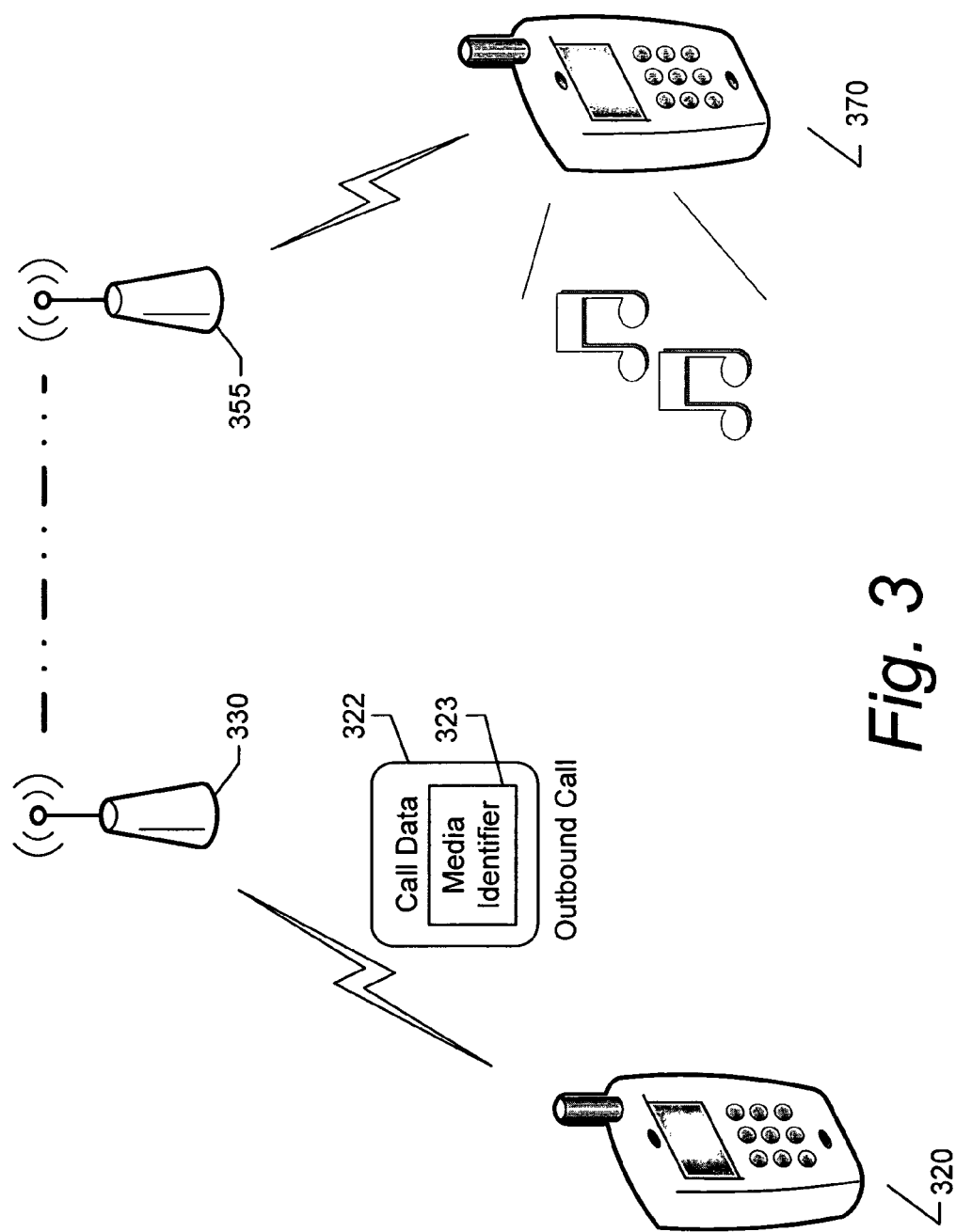
FIG. 3 is a conceptual illustration of a system that implements the invention to enable a call originating device to direct the announcement that is made on a call receiving device when a call is received from the originating device.

FIG. 3 is a conceptual illustration of a system that implements the invention to enable a call originating device 320 to direct the announcement that is made on a call receiving device 370 when a call is received from the originating device 320.

The originating device 320 initiates the call to the receiving device 370. Call set-up data 322 from the originating device 320 to its Mobile Telephone Switching Office (MTSO 330) includes the called number and information (a "media identifier" 323) that identifies the announcement to be played when the call arrives at the receiving device (the "requested announcement"). In one embodiment, the originating device 320 communicates with the MTSO 330 using a next-generation communications technology, such as Voice Over IP (VOIP). More particularly, the protocol in use between the originating device 320 and the MTSO 330 to set-up the call allows the originating device 320 to pass information to the MTSO 330 in addition to the digits of the called party's number.

Caller ID information may be added to the call data by the MTSO 330 and transmitted to the receiving device's MTSO 355. The media identifier 323 may be included in the caller ID information, perhaps as an extension to the Multiple Data Message Format (MDMF) protocol, and transmitted from the MTSO 355 to the receiving device 370. If an alternative protocol is used to set-up the call, the media identifier 323 could be included in whatever data package is transmitted to the receiving device 370. When received, the receiving device 370 extracts the media identifier 323 for the requested announcement and renders it to announce the incoming call. Thus, using this system, the originating device 320 has directed which announcement is used to announce the incoming call.

In some cases, the requested announcement might not exist on the receiving device 370 In that case, the receiving device 370 could do a best-match type analysis, or simply substitute any other announcement. Similarly, the receiving device 370 may not be configured to handle incoming requests for particular call announcements. In that case, the receiving device 370 could simply ignore the additional information in the call data and announce the call normally.

Figure 4:
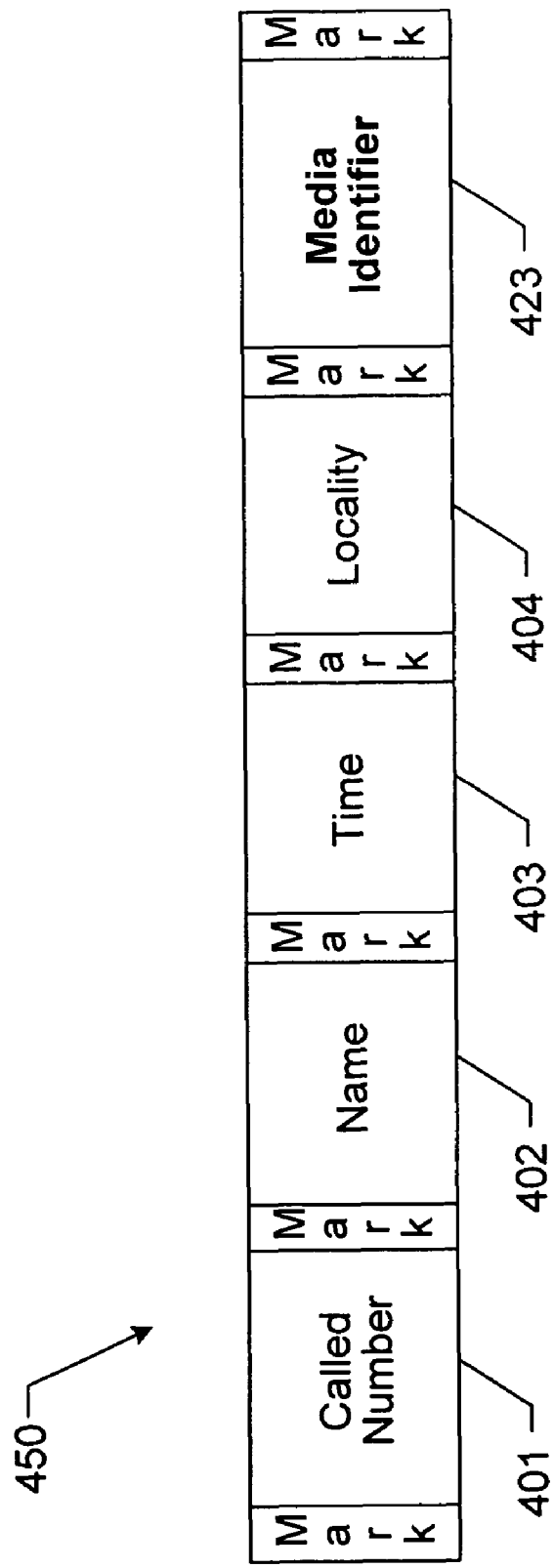
FIG. 4 is a functional block diagram generally illustrating a sample message format that may be used in implementations of the invention.

FIG. 4 is a functional block diagram generally illustrating a sample message format 450 that may be used in implementations of the invention. The sample message format 450 is an extension of the existing MDMF protocol used in the telecommunications industry to provide data to the receiving device prior to a call being established. The MDMF protocol allows for the inclusion of certain identifying information about the calling party (e.g., phone number 401, name 402, time 403, locality 404) encoded as a tone provided to the receiving device between the first and second rings, prior to the circuit being connected. The invention envisions an extension to this or a similar protocol to add arbitrary data, namely a media identifier 423, provided by the originating device. In this way, the originating device can transmit to the receiving device the identifier for the requested announcement.

This extension could be used to transmit other information as well. For example, either in addition to or in lieu of the media identifier 423, the originating device could add compressed image data that represents a picture of the call originator. In this way, the person receiving the call could see who is calling without having such image information pre-stored on the receiving device.

In another extension, rather than transmitting an identifier for a particular call announcement, the originating device could include the actual call announcement data, perhaps in compressed audio or video format. In this way, the user of the originating device not only could ensure that the requested announcement existed at the receiving device, but arbitrary announcements could also be recorded and transmitted to the receiving device to be played prior to the call being connected. In one example, the user could record a brief message and have that message transmitted as the call announcement for an outbound call. Perhaps the message could be "Urgent message from Joe!"

Figure 5:
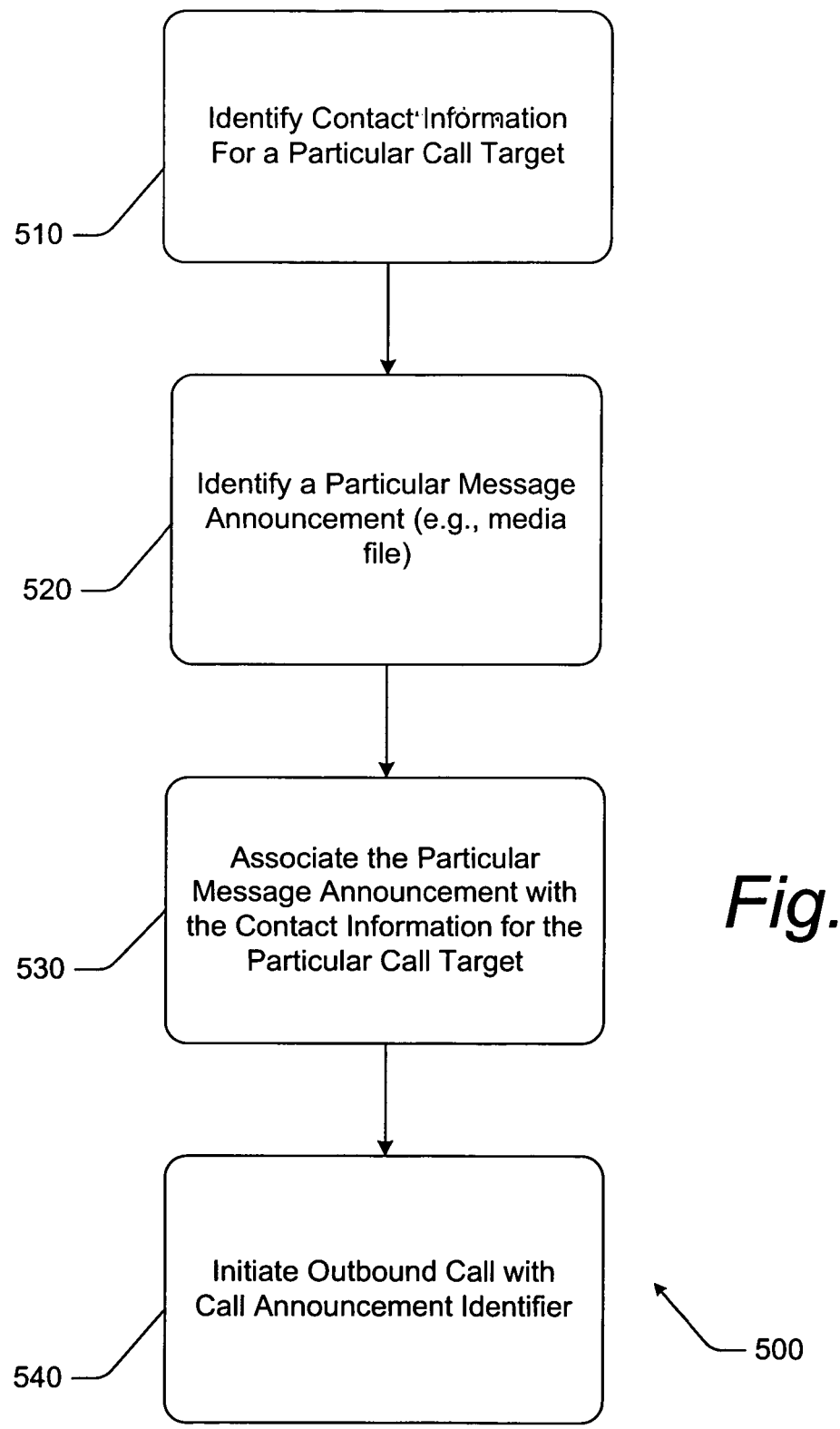
FIG. 5 in an operational flow diagram generally illustrating one implementation of a process performed on a call originating device for associating particular call announcements to be played on a receiving device when receiving calls from the originating device.

FIG. 5 in an operational flow diagram generally illustrating one implementation of a process performed on a call originating device for associating particular call announcements to be played on a receiving device when receiving calls from the originating device. The process 500 may be performed on a telecommunications device configured to make and receive telephone calls or to send and receive other messages, such as electronic mail, SMS and MMS messages, instant messages, and the like.

At step 510, contact information is identified for a particular receiving device. In this implementation, the receiving device represents the entity or individual to which a call can be made, and the contact information includes the mechanism for initiating a call to the receiving device, commonly a telephone number. The contact information may also include additional information about the entity or individual, such as name and address.

At step 520, a particular call announcement for outbound calls to the receiving device is identified. In one implementation, the call announcement is a media file, such as a MIDI sound file, that provides a unique announcement distinguishable from other announcements. Ringtones are one example.

Identifying the call announcement could include simply navigating to it in a file system or menu of various call announcements. Alternatively, identifying the call announcement could include creating it, such as by recording or typing a brief message or capturing an image.

At step 530, the particular outbound call announcement is associated with the contact information for the receiving device. Unlike conventional technologies, which allow particular call announcements to be associated with a calling entity for inbound calls, the invention envisions identifying a particular call announcement for outbound calls. Associating the announcement with the contact information could be including an identifier for the particular call announcement as a record or the like in the contact information.

It should be noted that in the case where a common outbound call announcement is used, both steps 510 and 530 may be optional or unnecessary. In addition, it should be noted that there is no significance to the order of steps 510 and 520 as either could be identified first.

At step 540, an outbound call is made that includes information identifying the call announcement to be played on the call receiving device. In one implementation, the originating device and its switching office communicate using a call set-up protocol that allows arbitrary or other extended data to be transmitted from the originating device to the switching office. For example, in next generation Voice Over IP telephony, communications between the originating device and the switching office may be of a form that allows packets of ordinary data, in addition to simply an off-hook signal and calling party number. In this case, the identifying information may simply take the form of a pre-defined message type that is included with call set-up information sent to the switching office from the originating device. It may also include extended information such as full contact information from the originating device or multimedia such as an appropriate ringtone, picture, etc. This information could also be obtained either as data transmitted with the call (in the case of a VOIP call) or by a reverse number-to-name lookup in a database of such information.

Figure 6:
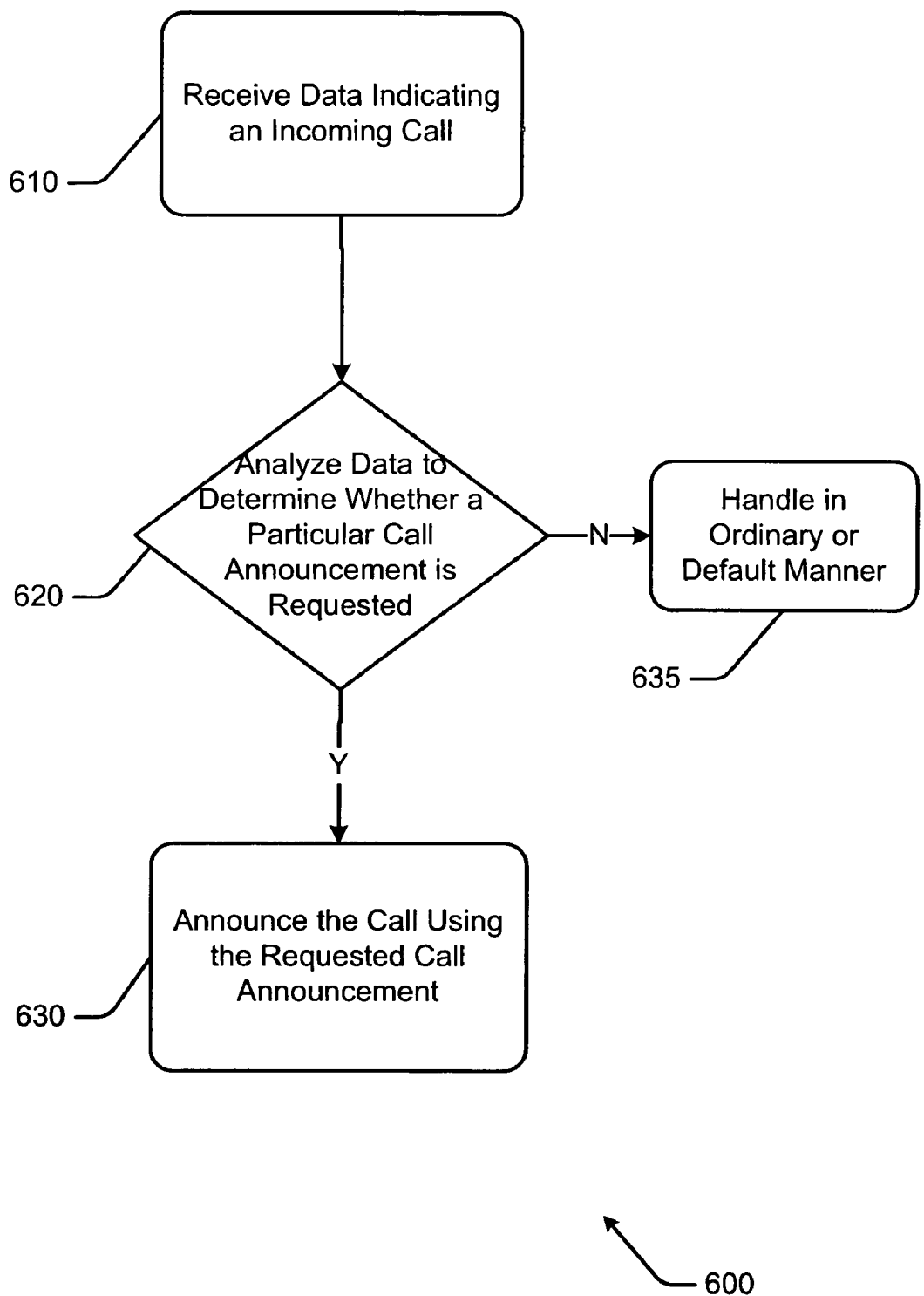
FIG. 6 is an operational flow diagram generally illustrating a process for announcing an incoming call using a call announcement identified by the device originating the call.

FIG. 6 is an operational flow diagram generally illustrating a process 600 for announcing an incoming call using a call announcement identified by the device originating the call. The process 600 may be performed on any telecommunications device configured to receive incoming calls and to announce the incoming calls using a selectable announcement.

At step 610, the receiving device receives a notification of an incoming call. In one embodiment, the incoming notification includes caller ID data, such as an MDMF caller ID message, that is encoded with information such as the calling party's (originating device's) telephone number. In addition, the notification includes an identifier for a particular call announcement to be used to announce the incoming call.

At step 620, the receiving device analyzes the incoming notification to determine if a particular call announcement is being requested. In one specific example, the receiving device may decode an MDMF tone to determine whether a special message type is included that indicates a particular call announcement is being requested. Alternatively, the incoming notification may take the form of special data messages transmitted using next-generation communication technologies, such as VOIP.

At step 630, if a particular call announcement has been requested, the receiving device announces the call using the particular call announcement. In one example, the call announcement could take the form of a special ringtone or other media file. Alternatively, the call announcement could take the form of a recorded message, or perhaps even a graphical image. A more detailed description of announcing the incoming call is provided below in conjunction with FIG. 7.

At step 635, if no particular call announcement has been requested, then the incoming call is announced in the ordinary or default manner.

Figure 7:
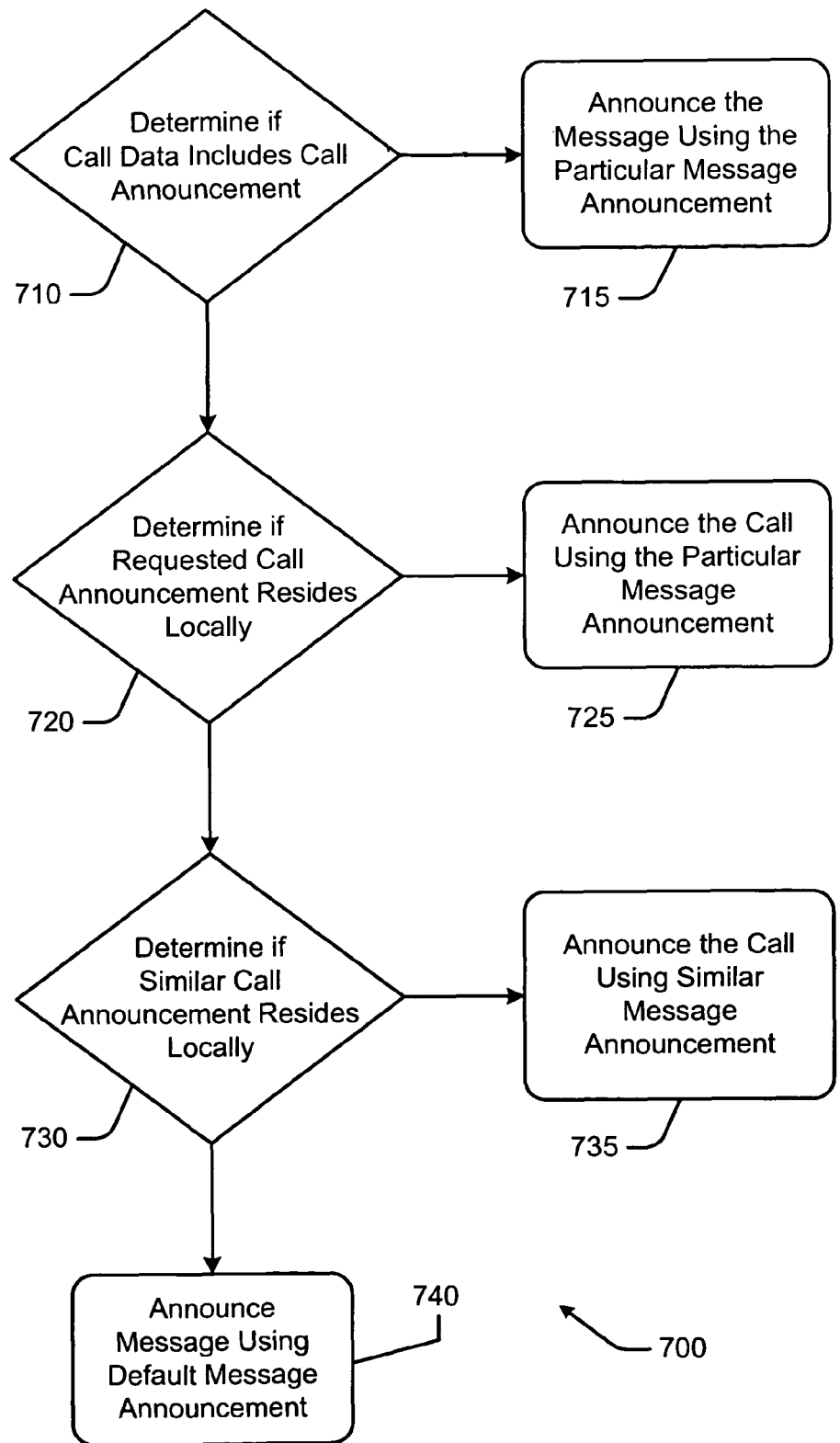
FIG. 7 is an operational flow diagram illustrating in slightly greater detail a process for announcing an incoming call with a particular call announcement as requested by the originating device.

FIG. 7 is an operational flow diagram illustrating in slightly greater detail a process 700 for announcing an incoming call with a particular call announcement as requested by the originating device. This process 700 is performed when call data is received indicating that a particular call announcement has been requested for an incoming call.

At step 710, the receiving device determines if the incoming call data includes the call announcement itself, such as in the case where an image file or an entire media file is transmitted in the call data to announce the call. If so, then the receiving device renders that incoming call announcement (step 715).

At step 720, if the incoming call data does not include the call announcement itself, but rather only identifies a call announcement, a determination is made whether the incoming call data identifies a call announcement that resides locally. If so, then the call is announced using the local call announcement that was requested (step 725).

At step 730, if the requested call announcement does not reside locally, the receiving device determines if a similar call announcement exists locally that can be used. For instance, the requested call announcement may be identified by a filename or by a more generic descriptor, such as any three-tone ring or any music by Bach. In that case, the receiving device determines if a locally resident call announcement satisfies the description of the requested call announcement. If so, then the similar call announcement is rendered on the receiving device (step 735).

At step 740, if no similar call announcement resides locally or if the requested call announcement is not described in such a way that similar call announcements can be identified, then the incoming call is announced using a default or other conventional call announcement.

While the present invention has been described with reference to particular embodiments and implementations, it should be understood that these are illustrative only, and that the scope of the invention is not limited to these embodiments. Many variations, modifications, additions and improvements to the embodiments described above are possible. These variations, modifications, additions and improvements fall within the scope of the invention as detailed within the following claims.

We claim:

1. A method for announcing an incoming call on a receiving device, comprising:
   receiving call data associated with an incoming call;
   analyzing the call data to determine whether a particular call announcement has been requested;
   if the particular call announcement has been requested, determining if the requested call announcement resides locally on the receiving device; and
   if the requested call announcement does not reside locally, determining if a similar message announcement resides locally, and if so, announcing the call using the similar call announcement.

2. The method recited in claim 1, wherein if the similar message announcement cannot be identified, announcing the call using a conventional call announcement.

3. The method recited in claim 1, wherein the call data comprises caller ID data.

4. The method recited in claim 3, wherein the caller ID data comprises data in a multiple data message format.

5. The method recited in claim 1, wherein the particular call announcement comprises an implementation of a sensory perceptible occurrence that is performed by the receiving device to announce the incoming call.

6. The method recited in claim 5, wherein the particular call announcement comprises a ringtone.

7. The method recited in claim 5, wherein the particular call announcement comprises a vibratory sequence.

8. The method recited in claim 5, wherein the particular call announcement comprises a sequence of flashing lights.

9. The method recited in claim 5, wherein the particular call announcement comprises an image.

10. A device for announcing an incoming call on a receiving device, comprising:
   means for receiving call data associated with an incoming call;
   means for analyzing the call data to determine whether a particular call announcement has been requested;
   means for determining if the requested call announcement resides locally on the receiving device if the particular call announcement has been requested;
   means for determining if a similar message announcement resides locally if the requested call announcement does not reside locally; and
   means for announcing the call using the similar call announcement if the similar message announcement resides locally.

11. The device recited in claim 10, further comprising means for announcing the call using a conventional call announcement to be used when the similar message announcement cannot be identified.

12. The device recited in claim 10, wherein the call data comprises caller ID data.

13. The device recited in claim 12, wherein the caller ID data comprises data in a multiple data message format.

14. The device recited in claim 10, further comprising means for implementing a sensory perceptible occurrence that is performed by the receiving device to announce the incoming call.

15. The device recited in claim 14, wherein the means for implementing the sensory perceptible occurrence renders a ringtone.

16. The device recited in claim 14, wherein the means for implementing the sensory perceptible occurrence renders a vibratory sequence.

17. The device recited in claim 14, wherein the means for implementing the sensory perceptible occurrence renders a sequence of flashing lights.

18. The device recited in claim 14, wherein the means for implementing the sensory perceptible occurrence renders an image.

19. A non-transitory computer-readable medium having stored thereon computer-executable instructions configured to cause a processor of a receiver device to perform operations comprising:
   receiving call data associated with an incoming call;
   analyzing the call data to determine whether a particular call announcement has been requested;
   if the particular call announcement has been requested, determining if the requested call announcement resides locally on the receiving device; and
   if the requested call announcement does not reside locally, determining if a similar message announcement resides locally, and if so, announcing the call using the similar call announcement.

20. The non-transitory computer-readable medium of claim 19, wherein the computer-executable instructions are further configured to cause a processor to perform operations further comprising announcing the call using a conventional call announcement if the similar message announcement cannot be identified.

21. The non-transitory computer-readable medium of claim 19, wherein the call data comprises caller ID data.

22. The non-transitory computer-readable medium of claim 21, wherein the caller ID data comprises data in a multiple data message format.

23. The non-transitory computer-readable medium of claim 19, wherein the computer-executable instructions are further configured to cause a processor to perform operations further comprising implementing a sensory perceptible occurrence that is performed by the receiving device to announce the incoming call.

24. The non-transitory computer-readable medium of claim 23, wherein the particular call announcement comprises a ringtone.

25. The non-transitory computer-readable medium of claim 23, wherein the particular call announcement comprises a vibratory sequence.

26. The non-transitory computer-readable medium of claim 23, wherein the particular call announcement comprises a sequence of flashing lights.

27. The non-transitory computer-readable medium of claim 23, wherein the particular call announcement comprises an image.

28. A device for announcing an incoming call on a receiving device, comprising:
   a processor which receives call data associated with an incoming call, the processor analyzing the call data to determine whether a particular call announcement has been requested and determining if the requested call announcement resides locally on the receiving device if the particular call announcement has been requested, wherein the processor determines if a similar message announcement resides locally if the requested call announcement does not reside locally and announces the call using the similar call announcement if the similar message announcement resides locally.

29. The device recited in claim 28, further comprising means for announcing the call using a conventional call announcement to be used when the similar message announcement cannot be identified.

* * * * *